United States Patent [19]

Masom

[11] Patent Number: 4,521,088
[45] Date of Patent: Jun. 4, 1985

[54] OPTICAL ELEMENT HAVING A CATALYTIC COATING TO PROMOTE OXIDATION OF OPTICALLY-OPAQUE SUBSTANCES

[75] Inventor: Ronald A. Masom, Bitterne, England

[73] Assignee: Smiths Industries Public Limited Company, London, England

[21] Appl. No.: 504,339

[22] Filed: Jun. 14, 1983

[30] Foreign Application Priority Data

Jun. 17, 1982 [GB] United Kingdom ............... 8217559

[51] Int. Cl.³ .............................................. G02B 1/10
[52] U.S. Cl. ............................................... 350/582
[58] Field of Search ............................. 350/582, 584

[56] References Cited

U.S. PATENT DOCUMENTS

| | | | |
|---|---|---|---|
| 3,861,802 | 1/1975 | Belmear | 350/582 |
| 4,358,952 | 11/1982 | Maurer et al. | 350/582 |
| 4,418,661 | 12/1983 | Esper et al. | 123/145 R |

FOREIGN PATENT DOCUMENTS

| | | | |
|---|---|---|---|
| 74501 | 6/1980 | Japan | 350/582 |
| 742711 | 1/1980 | U.S.S.R. | 350/582 |

OTHER PUBLICATIONS

S. C. Crossan et al., "Window Protection", *IBM Tech. Disc. Bull.*, vol. 19, No. 6, Nov. 1976, pp. 1985–1986.

*Primary Examiner*—Jon W. Henry
*Attorney, Agent, or Firm*—Pollock, VandeSande and Priddy

[57] ABSTRACT

A radiation pyrometer for a gas-turbine engine has a sapphire lens that focusses radiation from the turbine blades onto the end of a fibre-optic cable. The front, exposed surface of the lens has a vapor deposited layer comprising a mixture of platinum and aluminum oxide which acts as a catalyst to promote oxidation of soot to a gaseous form and thereby reduce contamination of the lens.

3 Claims, 2 Drawing Figures

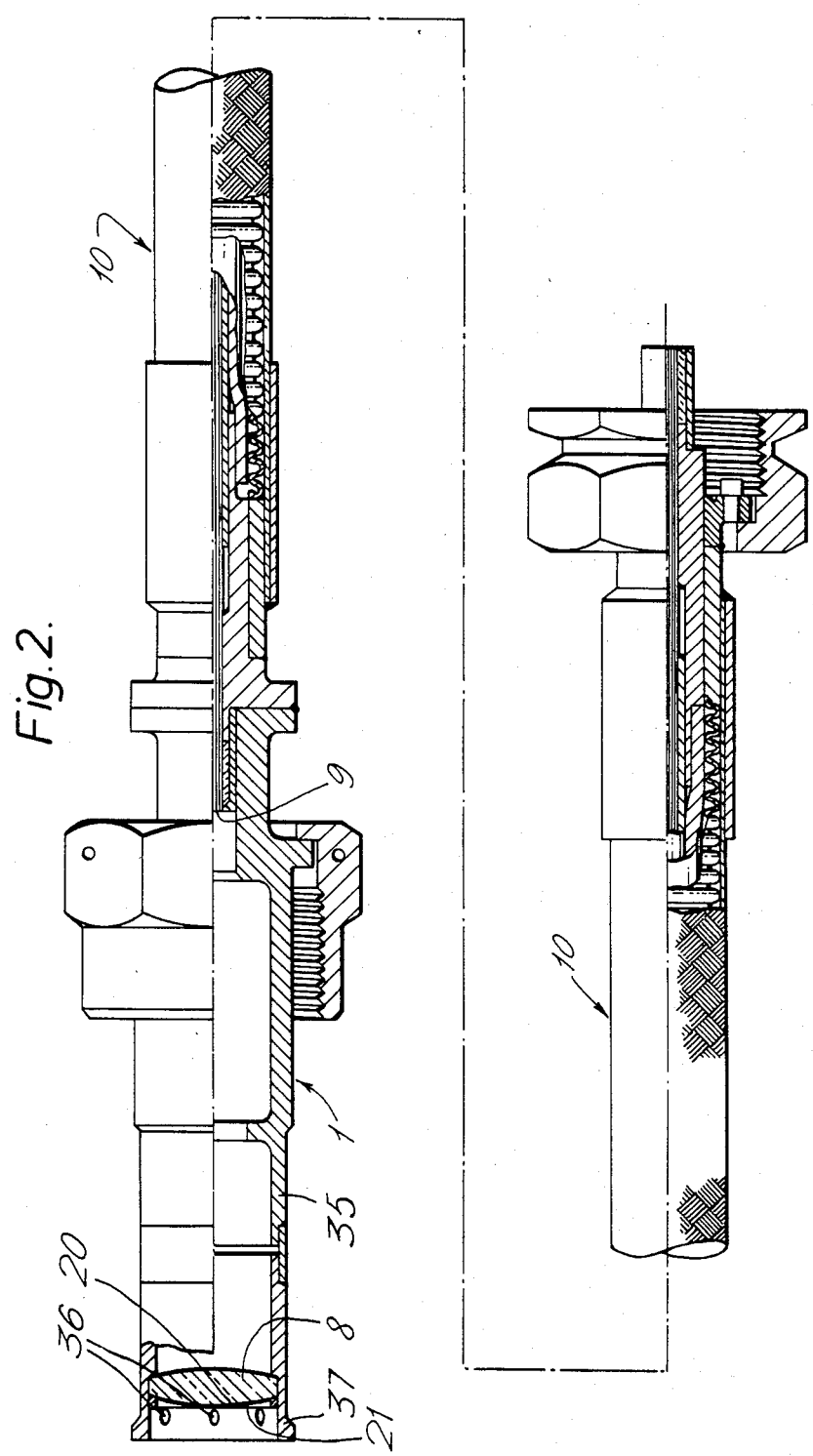

OPTICAL ELEMENT HAVING A CATALYTIC COATING TO PROMOTE OXIDATION OF OPTICALLY-OPAQUE SUBSTANCES

BACKGROUND OF THE INVENTION

This invention relates to optical elements and to apparatus including such elements.

The invention is more particularly, but not exclusively concerned with lenses or windows for radiation pyrometers or other optical apparatus liable for fouling.

Radiation pyrometers used on gas-turbine engines for sensing, for example, the turbine-blade temperature, conventionally have an optical head that is mounted to project through the engine by-pass duct to the turbine chamber. The head is directed to receive radiation from the turbine blades, and in this respect includes a lens or other optical window within a sighting tube that opens through the wall of the chamber. The use of the sighting tube ensures tha radiation is received throughout a limited angle only, and also that the window is not exposed directly to the heat and combustion products within the chamber.

One problem with such pyrometers is that the lens or other window is liable to become fouled by combustion or other products during running of the engine, thereby reducing transmission of radiation.

Air can be supplied to the sighting tube to purge it of combustion products and this does to some extent reduce fouling. Problems of fouling, however, do still arise, especially during start up or shut down of the engine when the pressure of purging air may be reduced, or when the purging system becomes blocked or otherwise damaged. In some engines it may not be possible to provide a purging system and this can make it necessary to remove the pyrometer to clean the lens after only some thirty to one hundred hours of operation.

BRIEF SUMMARY OF THE INVENTION

It is an object of the present invention to reduce the fouling that arises on such optical elements and thereby alleviate the problems that arise because of fouling.

According to one aspect of the present invention there is provided an optical element having a surface layer including a catalytic material that is effective to reduce fouling of the element by optically-opaque substances.

The catalytic material may be effective to lower the temperature of oxidation of optically-opaque substances so as to promote conversion of said substances to a gaseous form. In this respect, the surface layer may include a mixture of platinum and aluminum oxide. The optical element may be a lens, or a reflective element.

According to another aspect of the present invention there is provided apparatus for viewing a combustion chamber, the apparatus having a forward end adapted for location in the vicinity of the combustion chamber and having an optically-transparent element, mounted towards the forward end of the apparatus, through which radiation from the combustion chamber passes to a radiation sensor, the forward surface of the element having a surface layer including a catalytic material that is effective to lower the temperature of oxidation of optically-opaque substances contacting the element to a temperature below that to which the element is subjected in use, so as to promote conversion of said substances to a gaseous form.

According to a further aspect of the present invention there is provided pyrometer apparatus including a radiation sensor, and an optically-transparent element mounted forwardly of the sensor such that radiation passes through the element to the sensor, the forward surface of the element having a surface layer including a catalytic material that is effective to promote the oxidation of substances contacting the layer to a gaseous form.

A radiation pyrometer on a gas-turbine engine, including an optical element both according to the present invention, will now be described, by way of example, with reference to the accompanying drawings.

BRIEF DESCRIPTION OF THE DRAWINGS

FIG. 2 is a sectional view of the pyrometer in greater detail.

DETAILED DESCRIPTION

Figure 1:
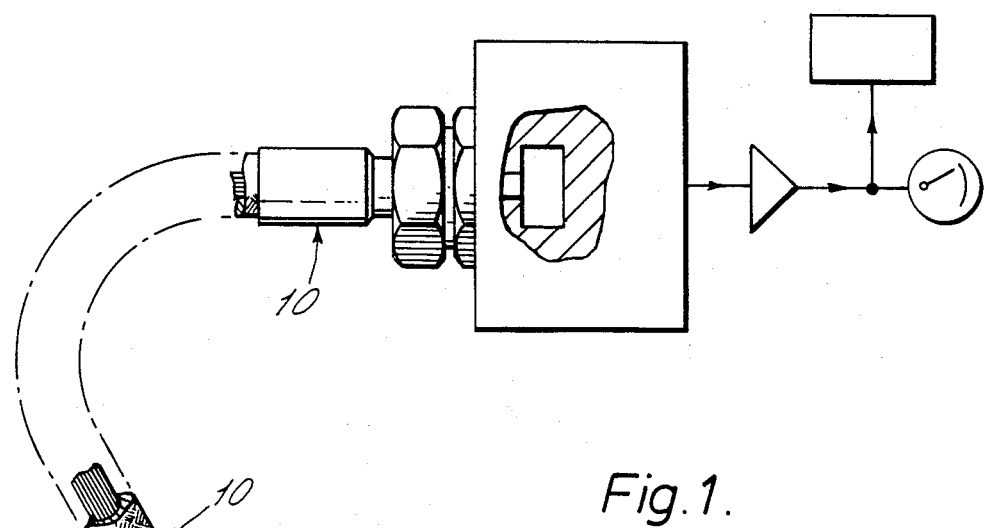
FIG. 1 is a partly-sectional view of the pyrometer showing its installation.
Figure 1:
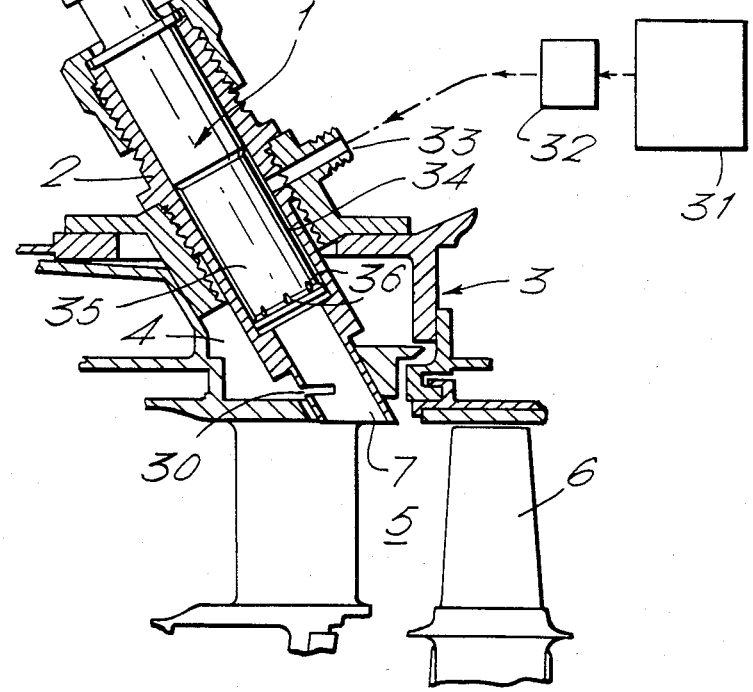

Referring to both Figures, the radiation pyrometer has an optical head 1 that is enclosed by a metal sleeve 2 mounted on the turbine casing 3 of the engine. The sleeve 2 extends through the engine by-pass duct 4 to the turbine chamber 5 for directing the head 1 towards the turbine blades 6. More particularly, the sleeve 2 incorporates a sighting tube 7 that opens into the chamber 5 from the duct 4 and serves to channel radiation from the blades 6 to a synthetic-sapphire lens 8 (FIG. 2) in the head 1. The lens 8 focusses radiation received from the blades 6 onto the end 9 of a fibre-optic cable 10.

Provision is made in this embodiment to purge fuel and combustion products from the tube 7 during running of the engine, and in this respect the tube 7 has a slot 30 that opens into the by-pass duct 4. Cooling air as conventionally supplied to the duct 4 from the compressor stage of the engine, flows through the slot 30 into the tube 7 to be exhausted into the chamber 5 so as to block to a substantial extent entry of fuel and combustion products into the tube 7 during running.

The pressure of the cooling air supplied to the duct 4 is, however, low during starting of the engine and is in general insufficient to ensure that fuel-air mixture does not enter the tube 7 at this time. To help block entry of the fuel-air mixture in these conditions, purging air may be supplied from a separate source 31.

The air-supply source 31 is coupled via a non-return valve 32 to an inlet 33 on the sleeve 2 to pass low-pressure air (for example, at 80 pounds per square inch) into an annular space 34 between the sleeve 2 and the casing 35 of the head 1. The air is vented from the space 34 across the front surface of the lens 8 into the tube 7 via circumferentially-distributed ports 36 in a lens-retaining ring 37 (FIG. 2) of the casing 35. The flow of air across the lens 8 into the tube 7 purges the tube 7 of the fuel-air mixture, and continues as starting proceeds, until the pressure applied to the inlet 33 is exceeded by that in the by-pass duct 4. Air which now flows through the slot 30 from the duct 4 to maintain purging of the tube 7, creates a curtain trapping the volume of clean and virtually stagnant air remaining adjacent the lens 8, above the slot 30. The slot 30 is inclined forwardly to direct flow downwardly of the tube 7 and thereby enhance the curtain effect.

So as further to reduce any fouling of the lens 8, the forward, exposed surface 20 of the lens is coated with a thin layer 21 of a platinum and aluminum oxide mixture. The thickness of the layer 21 is such that it is substantially transparent to radiation of the wavelengths to which the pyrometer is responsive. The material of the layer 21 acts as a catalyst, to promote oxidation of soot, or other combustion products by, in effect, lowering the temperature at which oxidation occurs to a temperature below that to which the lens is exposed in use. In this way, instead of being deposited on the surface of the lens as an opaque layer, the soot is converted to a gaseous, transparent form (such as carbon dioxide or carbon monoxide) which does not hinder passage of radiation through the lens.

By coating the lens 8 with a catalytic layer 21 which reduces fouling, it is possible to extend the periods for which the pyrometer can be used without cleaning the lens, especially where no purging system is provided.

The lens 8 is manufactured by grinding a blank of sapphire to give it the desired focal length and then coating it with a layer of a platinum and aluminum oxide mixture by vapour deposition. It will be appreciated that various other methods could be employed to coat the lens.

Various other catalytic materials could be used, and these need not necessarily function by promoting oxidation. They could reduce fouling of the lens by bringing about other chemical changes of any substance deposited on the lens. In this respect, instead of converting a fouling substance to a gaseous form, it might be possible for a catalyst to convert the substance to a solid or liquid form having a greater transparency. Alternatively, the catalyst could act in other ways to convert any fouling substance to a more readily dispersed form.

The catalytic layer has a long life because it is not permanently changed by its action on the fouling substances.

In some circumstances it may be necessary to provide the lens with a protective layer prior to coating with the catalytic layer.

The layer of catalytic material could be provided instead on an optically-transparent window located forwardly of the lens, so as to protect the lens. The invention could also be applied to optically-reflective elements such as that described in UK patent application GB 2087588A.

It will be appreciated with the invention is not restricted to use in pyrometers but could find application in optical elements of other apparatus liable to fouling.

What I claim is:

1. Apparatus for viewing a combustion chamber, the apparatus having forward and rear ends; means mounting said apparatus such that said forward end is located in the vicinity of the combustion chamber; an optically-transparent element having forward and rear surfaces; a surface layer exposed on said forward surface of said element, said layer being substantially transparent to radiation of the wavelengths to which said element is exposed and comprising a catalytic material selected to lower the temperature of oxidation of optically-opaque substances contacting the element below the temperature to which said element is exposed, so as to promote conversion of said substances to a gaseous form; and means mounting said optically-transparent element towards said forward end of the apparatus.

2. Pyrometer apparatus having forward and rear ends, an optically-transparent element having forward and rear surfaces, means mounting said optically-transparent element towards the forward end of said pyrometer apparatus, said optically-transparent element having a layer exposed on said forward surface consisting of a catalytic material selected to promote oxidation of substances contacting said layer to a gaseous form, the thickness of said layer and the catalytic material therein being such that said layer is substantially transparent to radiation of the wavelengths to which the pyrometer apparatus is responsive.

3. Pyrometer apparatus according to claim 2, wherein said layer on the forward surface is a mixture of platinum and aluminum oxide.

* * * * *